US009847608B2

(12) United States Patent
Bruex et al.

(10) Patent No.: US 9,847,608 B2
(45) Date of Patent: Dec. 19, 2017

(54) METHOD OF CONFIGURING A MODULAR PLUG CONNECTOR

(71) Applicant: HARTING Electric GmbH & Co. KG, Espelkamp (DE)

(72) Inventors: Markus Bruex, Cologne (DE); Lutz Troeger, Osnabrueck (DE); Markus Friesen, Espelkamp (DE)

(73) Assignee: HARTING AG & CO. KG (DE)

( * ) Notice: Subject to any disclaimer, the term of this patent is extended or adjusted under 35 U.S.C. 154(b) by 0 days.

(21) Appl. No.: 15/301,671

(22) PCT Filed: Apr. 2, 2015

(86) PCT No.: PCT/DE2015/100143
§ 371 (c)(1),
(2) Date: Oct. 3, 2016

(87) PCT Pub. No.: WO2015/149757
PCT Pub. Date: Oct. 8, 2015

(65) Prior Publication Data
US 2017/0141518 A1 May 18, 2017

(30) Foreign Application Priority Data
Apr. 2, 2014 (DE) ........................ 10 2014 104 629

(51) Int. Cl.
*H01R 13/66* (2006.01)
*H01R 13/514* (2006.01)
(Continued)

(52) U.S. Cl.
CPC ....... *H01R 13/665* (2013.01); *G06F 13/4004* (2013.01); *H01R 13/514* (2013.01); *H01R 13/518* (2013.01); *H01R 13/6683* (2013.01)

(58) Field of Classification Search
CPC .. H01R 13/514; H01R 13/518; H01R 13/665; H01R 13/6683; G06F 13/4004
(Continued)

(56) References Cited

U.S. PATENT DOCUMENTS 6,004,162 A * 12/1999 Harting ................ H01R 13/518
439/532
7,065,470 B2   6/2006 Seel ............................ 702/183
(Continued)

FOREIGN PATENT DOCUMENTS

DE      19707120      6/1998    ........... H01R 13/514
DE      10107100     12/2002    ............. H01R 13/66
(Continued)

OTHER PUBLICATIONS

German Office Action issued in application No. 10 2014 104 629.3, dated Jan. 23, 2015 (7 pgs).
(Continued)

*Primary Examiner* — Harshad C Patel
(74) *Attorney, Agent, or Firm* — Hayes Soloway P.C.

(57) ABSTRACT

A modular plug connector includes a plug connector housing, a retaining frame accommodated therein, and at least one plug connector module. The retaining frame is connected to the plug connector housing by fasteners. The at least one plug connector module is accommodated in a module slot in the retaining frame by retaining elements. The plug connector modules are equipped with sensors, which are connected to evaluating electronics in the module plug connector. The evaluating electronics are provided for processing and rendering measured values of the sensors in the plug connector modules, recognizing the accommodated plug connector modules, and managing the configuration of the modular plug connector.

5 Claims, 5 Drawing Sheets

(51) Int. Cl.
*H01R 13/518* (2006.01)
*G06F 13/40* (2006.01)

(58) Field of Classification Search
USPC .................................................... 439/620.1
See application file for complete search history.

(56) References Cited

U.S. PATENT DOCUMENTS

| | | | |
|---|---|---|---|
| 7,316,591 B2 * | 1/2008 | Ferderer | H01R 13/506 |
| | | | 439/532 |
| 7,322,842 B2 | 1/2008 | Dück et al. | 439/289 |
| 7,668,685 B2 | 2/2010 | Kathan et al. | 702/127 |
| 9,502,813 B2 * | 11/2016 | Dugo | H01R 9/2408 |
| 2004/0184244 A1 * | 9/2004 | Uezono | B60R 16/0238 |
| | | | 361/748 |

FOREIGN PATENT DOCUMENTS

| | | | | |
|---|---|---|---|---|
| DE | 102005049483 | 4/2007 | ............ | H01R 13/66 |
| DE | 202007018306 | 4/2008 | ............ | G01D 11/24 |
| DE | 202007018307 | 6/2008 | ............ | G01D 11/24 |
| DE | 102012107902 | 3/2014 | ............ | H01R 13/66 |
| EP | 1353412 | 10/2003 | ............ | G02B 6/38 |

OTHER PUBLICATIONS

International Search Report and Written Opinion issued in application PCT/DE2015/100143, dated Sep. 18, 2015 (31 pgs).
International Preliminary Report on Patentability issued in application PCT/DE2015/100143, dated Oct. 13, 2016 (25 pgs).

* cited by examiner

METHOD OF CONFIGURING A MODULAR PLUG CONNECTOR

The invention relates to a modular plug connector according to the preamble of the independent claim 1.

Modular plug connectors of this type are required in order to transmit signals and currents between cables and/or devices. Signal-carrying and current-carrying cables or lines are connected for this purpose to the modular plug connector. The modular plug connector is directly connected to the cable or is mounted on a device as a so-called mounted housing. In the case of a modular plug connector that is embodied as a mounted housing, lines are routed directly from the housing without a cable into the modular plug connector and make contact with said modular plug connector.

Two modular plug connectors of this type are provided so as to make contact with one another. On the one hand, the modular plug connectors are connected to one another in a mechanical manner and also connected to the signal-carrying and/or current-carrying lines by means of contact means that are accommodated in the modular plug connector.

Depending upon the design of the modular plug connector, it is possible to accommodate in the modular plug connector: electrical contact means, optical contact means, pneumatic contact means, inductive contact means or fluid contacts.

Modular plug connectors of this type comprise a plug connector housing in which multiple different plug connector modules can be accommodated. The plug connector modules are standardized to a uniform module width. Plug connector modules can be embodied with a single, double or multiple module width.

The plug connector modules are accommodated in the plug connector housing and thus form an individual connection face of the modular plug connector. It is very common to accommodate the plug connector modules in a retaining frame. This renders it possible to assemble the plug connector modules in a simple manner to form a single modular insert. This modular insert can be inserted as one piece into the plug connector housing and fixed therein.

PRIOR ART

DE 19 707 120 C1 discloses a retaining frame for retaining plug connector modules and for installation in a plug connector housing or for screwing to wall surfaces, wherein the plug connector modules are inserted into the retaining frame and retaining means on the plug connector modules cooperate with cut-outs that are provided on opposite-lying wall parts (lateral parts) of the retaining frame and retain the plug connector modules in a positive-locking manner in the retaining frame.

DE 10 2012 107 902 A1 discloses a plug connector unit for an electrical device, in particular a device that consumes a high current, comprising at least two current paths that carry current during the operation of the device, each of said current paths comprises a contact element having a plug-in contact body and also a line connection that is connected in an electrically conductive manner to the plug-in contact body and also a line end piece that is connected in an electrically conductive manner to the line connection, said line end piece being part of the supply cable that leads to the device, a plug connector bridge having a contact carrier on which the contact elements are held in such a manner that the plug-in contact body lies on one side of the contact carrier and the line connections lie on the other side of the contact carrier, and a plug connector housing that encompasses the plug connector bridge, the cable connections and the line end pieces in such a manner to improve that any warming or heating of the contact elements as a result of the current can be detected as reliably as possible, it is proposed that the plug connector unit comprises at least one first temperature sensor and at least one second temperature sensor, that the at least one first temperature sensor is thermally coupled to at least one of the current paths to a greater extent than the at least one second temperature sensor and that the at least one second temperature sensor is thermally coupled to at least one reference region of the plug connector housing to a greater extent than the at least one first temperature sensor.

It is a disadvantage of solutions known from the prior art that it is only possible to monitor physical parameters of individual plug connectors. The required sensors must be matched and adjusted to suit the specific plug connector.

The same applies for the electronic unit required to evaluate the measured values of the particular sensors installed. Each plug connector requires a separate evaluating circuit as is known from DE 10 2012 107 902 A1.

As soon as it is necessary to measure and monitor physical variables in a plug connector, it is necessary in order to measure and evaluate the measurement values to provide an electronic unit that is matched and adapted especially to suit the plug connector. It is extremely complex and expensive to adapt such an electronic unit and it cannot be used universally.

OBJECT OF THE INVENTION

The object of the invention is to provide a modular plug connector that comprises an electronic unit for measuring and evaluating physical variables of the plug connector, wherein the electronic unit can be used universally and can be used for an individual combination of the modular plug connector.

The object is achieved by virtue of the characterizing features of the independent claim 1.

Advantageous embodiments of the invention are disclosed in the subordinate claims.

The invention relates to a modular plug connector comprising a plug connector housing, a retaining frame and at least one plug connector module.

The plug connector housing can be of different designs. In addition to a conventional design as a housing having a cable receiving arrangement and a plug-in side in which a contact insert is inserted, it can also be a so-called mounted housing that is provided for mounting on a housing wall and does not comprise a separate cable receiving arrangement. Embodiments are also feasible as a mounted housing having an additional cable receiving arrangement.

The retaining frame is provided in the plug connector housing. This retaining frame can be embodied as one part with the plug connector housing or it can be fastened in the plug connector housing in a mechanically reversible manner.

The retaining frame comprises at least one module plug-in site which is provided for receiving plug connector modules. Depending upon the size of the modular plug connectors, the retaining frame can comprise one, two or more module plug-in sites. It has proven to be expedient and advantageous to have modular plug connectors and retaining frames that are connected thereto and comprise two, four, six or eight module plug-in sites.

The plug connector modules that are to be accommodated in the retaining frame can likewise be of different sizes. In addition to the latching dimension of a module plug-in site, double or multiple plug connector modules are expedient.

The plug connector modules comprise a module housing that can be embodied as a single part or as a multi-part. Contact means that are provided for making contact and transmitting signals or currents are provided in the module housing. For this purpose, signal-carrying or current-carrying lines or cores are connected at a connection side of the plug connector module to the contact means.

The contact means are accessible at a plug-in side of the plug connector module in order to be contacted by a corresponding plug connector module.

In the particular described embodiment, the plug connector modules can comprise sensors that render it possible to receive physical values. The values can be physical values of the contact means, such as for example current, voltage, pressure, frequencies or temperature but sensors for vibration, keys for the plugging operations or any other type of sensors are also feasible.

In accordance with the invention, the modular plug connector comprises an electronic evaluating unit that is suitable for processing the measured values that are recorded by the sensors. Any complex electronic unit that can perform different tasks is feasible.

The following tasks are feasible: processing the measured values, by way of identifying plug connectors and mating plug connectors, storing and also outputting and transmitting the configuration of the module plug connector or also detecting connected sensors and inserted plug connector modules.

A bus system is provided in the modular plug connector so as to render it possible for the electronic evaluating unit to communicate with the sensors and/or the plug connector modules. This renders it possible to connect a plurality of different modules and sensors to the electronic evaluating unit. In addition, the bus system can be used for transmitting energy and signals between sensors and the electronic evaluating unit.

By virtue of expanding the sensors in the plug connector modules by an electronic bus system, it is rendered possible for the electronic evaluating unit to recognize automatically the connected plug connector modules. The electronic evaluating unit can thus electronically image the physical configuration of the modular plug connector. It is thus possible to evaluate and process the measured values of different, inserted plug connector modules.

In order to render it possible to provide a data bus between the electronic evaluating unit and the individual plug connector modules, the plug connector modules comprise additional electrical contact means in addition to the contact means for transmitting signals and currents. These additional contact means are provided on two opposite-lying side faces of the plug connector module. The electrical contact means of one side are connected in an electric manner to the contact means of the other side.

It is possible by virtue of the additional contact means for plug connector modules that are arranged adjacent to one another and received in the retaining frame to make electrical contact with one another and thus form a data bus line. The sensors can be connected in the plug connector modules at the data bus lines that thus extend through all inserted plug connector modules.

In an advantageous embodiment, the electrical contact means are embodied on the one side of the plug connector module as plug-in contacts (male contacts). In contrast, the electrical contact means that are provided on the opposite-lying side are embodied as corresponding bush contacts (female contacts). As a consequence, it is possible to arrange a plurality of plug connector modules in rows adjacent to one another. The data bus line can thus be looped through any number of plug connector modules.

In an alternative embodiment, the data bus line is not provided through the plug connector modules but rather is received in the retaining frame. It is possible by means of corresponding lines in the retaining frame for the plug connector modules to make contact with the data bus line as said plug connector modules are inserted into the retaining frame. In addition, it is also possible to integrate the electronic evaluating unit in the retaining frame.

A further advantageous embodiment provides that the electronic evaluating unit is likewise provided in a plug connector module. As a consequence, the electronic evaluating unit can be inserted in a modular manner into an already existing modular plug connector. By virtue of joining the plug connector modules in accordance with the invention to the data bus line, it is thus possible to retrofit sensors and also an electronic evaluating unit to an already existing modular plug connector having plug connector modules.

A further advantage of this electronic evaluating unit in the latching dimension of the plug connector module is that it is possible to connect said electronic evaluating unit directly to the data bus line by way of lateral electrical contact means, said data bus line extending through the through the plug connector modules. The entire system can thus be integrated into existing plug connector housings having known retaining frames.

In addition, it is possible to integrate further functions into such a "master" module. It is thus feasible to integrate a communications interface into the module in order to be able to communicate with the electronic evaluating unit. This interface can be embodied as desired on the plug-in side so as to transmit signals by way of plug-in contacts to a plug connector module of a contacted mating plug connector. However, it is also feasible to provide an interface on the connection side and the signals are transmitted by way of said interface by means of a connected cable.

An additional embodiment provides that the interface for the electronic evaluating unit is achieved using wireless technology. Communication is thus possible via WLAN, Bluetooth, RFID or other wireless communication standards.

A particular embodiment of the invention provides that the electronic evaluating unit can be used and selected by means of a bidirectional interface. It is possible for this purpose to integrate a bidirectional interface into the plug connector housing of the modular plug connector in order for a user to be able to select and program the electronic evaluating unit.

It is possible to use as a bidirectional interface both a unit comprising a keypad and display or also a touch-screen-display that combines the advantages of an optical display with the opportunities to input information directly.

As an option, the electronic evaluating unit can be fitted with additional interfaces. It is thus possible to integrate by way of example additional memory devices or an interface for memory cards. Such an interface can be used for by way of example secure digital memory cards in order to transmit collected data by way of the plug connector module, measured values and operating times to an external device (e.g. a computer or tablet PC) and to evaluate said data in said external device.

In a preferred embodiment, the data bus line is an $I^2C$ bus. The $I^2C$ bus comprises two bus lines and also two lines for supplying the voltage. This arrangement is supplemented by a further serial line between the plug connector modules, said further serial line being required for addressing the plug connector modules.

Known bus systems are generally not suitable for use in such a small space as is available in a plug connector. Either the bus systems are very large and thus cannot be accommodated in the plug connector modules. In addition, bus systems of this type have mostly a very high energy consumption. As a result of the very small installation space in plug connector modules, these systems cannot be used in the plug connector.

Other bus systems, such as also the $I^2C$ bus are generally not suitable in order to recognize a geographic arrangement of slave modules. In the normal case, the slave modules have a unique ID for an $I^2C$ bus or they must be provided with an ID as they are connected to the bus system. Such a large expenditure would not be financially viable when assembling a modular plug connector. In addition, the assembly procedure and configuration must be performed by a specialist and such a specialist in the field of installing electronics is mostly not available on site.

The present invention therefore provides that all slave modules are to be delivered without a unique ID. The additional serial line between the plug connector modules thus renders it possible to allocate a unique ID to each module as the system is started up. In addition, it is not only possible to address each plug connector module individually but also to determine the geographic sequence of the modules and to store said geographic sequence in the ID.

For the purposes of allocating an ID to the plug connector modules, said plug connector modules are delivered with an empty ID. The modular plug connector is configured in a first step, in that different modules, so-called slave modules, are inserted adjacent to one another in the plug connector and connected in an electrical manner. In addition, the first of the slave modules makes contact with the electronic evaluating unit that can likewise be located in a module.

During the initialization procedure, the electronic evaluating unit allocates itself an ID=0. This ID=0 is transmitted by way of the additional serial line to the first slave module. Said slave module reads the ID of the master module (1) and increases this by 1 to 1. The first slave module stores this new ID=1 as its own ID and in addition transmits this to the next slave module. The second slave module behaves in an identical manner, increases the ID to 2, stores the own ID=2 and transmits this to the next module.

The configuration can be completed in different manners. In a first embodiment, the electronic evaluating unit of the master module waits a predetermined time period after which it regards the configuration of the slave module as being completed. A preferred further embodiment provides that the complete configuration can be recognized by way of a so-called interrupt line.

It is possible to use one of the bus lines for this purpose. A voltage is applied to and simultaneously measured at said bus lines by means of the master module. All connected slave modules have the interrupt line connected to earth in the initial state so that the master module is not able to register a voltage. During the course of allocating the ID, each slave module that is allocated an ID separates the interrupt line. If all slave modules have been allocated an ID and the interrupt line has been separated, the master module can thus register a voltage and as a consequence conclude that the initialization of the slave modules is complete.

In this manner, each slave module is allocated a unique ID. In addition, it is possible by means of the IDs of the slave modules to conclude the physical sequences and consequently using the electronic evaluating unit in the master module to conclude the configuration of the modular plug connector. According to the combination of the slave modules in the plug connector, the electronic evaluating unit can request from a database corresponding calculating and/or evaluating algorithms and load those algorithms that match into the slave modules and their sensors.

EXEMPLARY EMBODIMENT

The exemplary embodiment of the invention is illustrated in the drawings and further explained hereinunder. In the drawings.

The figures illustrate in part simplified, schematic views. Identical reference numerals are used in part for like but possibly not identical elements. Different views of like elements can be scaled differently.

Figure 1:
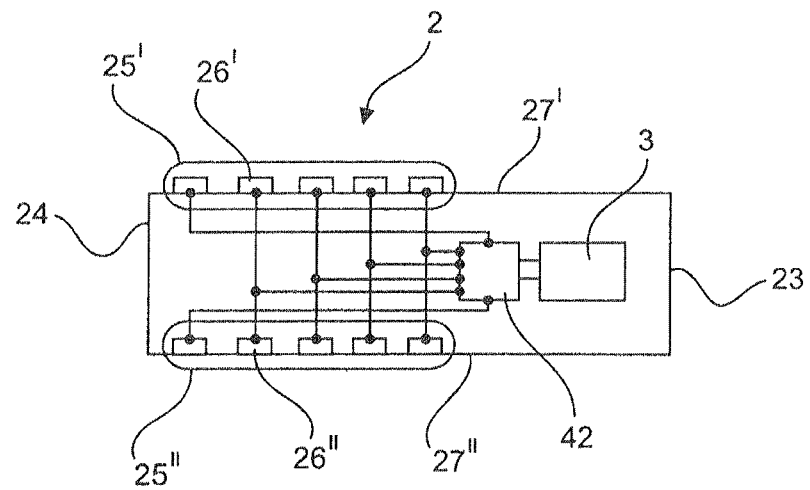
FIG. 1 illustrates a schematic view of a plug connector module.

The FIG. 1 illustrates a plug connector module 2 in a simplified schematic view. Elements of the plug connector module 2, such as contacts and retaining means 22, which are known from the prior art have been omitted in FIG. 1 and also in FIGS. 2 and 3 for the sake of clarity.

Figure 4:
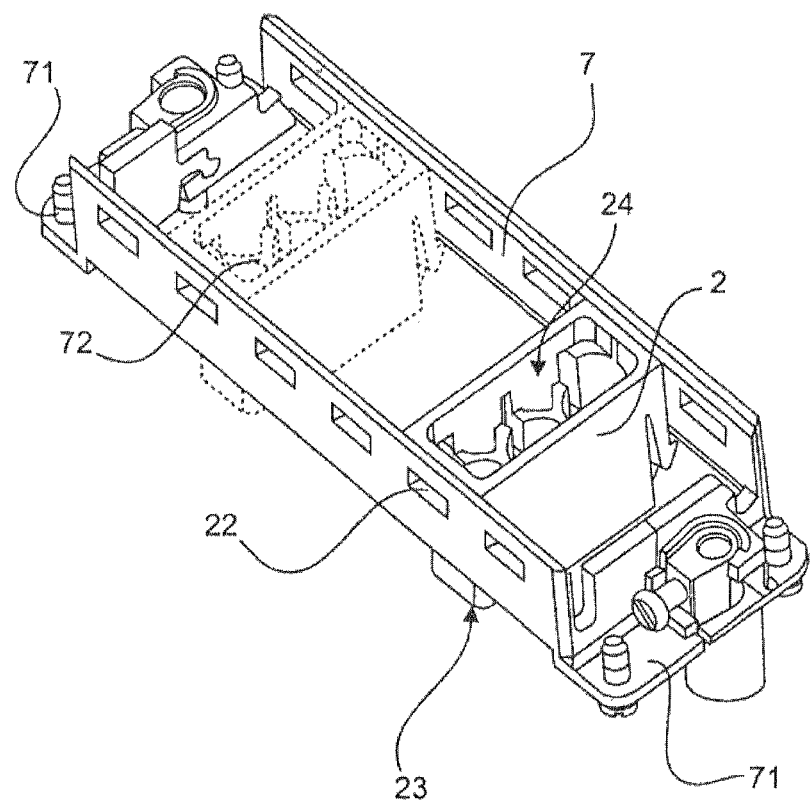
FIG. 4 illustrates a retaining frame of a module plug connector having a plug connector module.

The plug connector module 2 comprises a plug-in side 23 and a plug-in side 24 and is provided for the purpose of being received in a retaining frame 7, as illustrated in FIG. 4. For the purpose of being received in the retaining frame 7, the plug connector module 2 comprises retaining means 22 that engage in cut-outs in the retaining frame 7.

Depending upon the size of the modular plug connectors, retaining frames 7 can be embodied with different numbers of module plug-in sites 72. In the illustrated embodiment, six module plug-in sites 72 are provided for receiving plug connector modules 2. Different solutions that are known from the prior art are available for the embodiment of the retaining frame 7 and also the retaining means 22. The present invention can be applied to all these solutions and is not limited to the illustrated exemplary embodiment.

In addition, fastening means 71 are provided on the retaining frame 7 in order to fasten and fix the retaining frame 7 in a plug connector housing 1.

The plug connector module 2 illustrated in FIG. 1 comprises in accordance with the invention a sensor 3 in addition to the elements known from the prior art. The sensor 3 is provided in the plug connector module 2 so as to measure physical measurement variables. Different types of sensors 3 can be used depending upon the type and contacts of the plug connector module.

Expedient sensor types (not conclusive) are: temperature sensors for monitoring overheating, current sensors for monitoring the currents, vibration sensors for monitoring vibrations for example during movements, pressure sensors for monitoring pressures in pneumatic modules or a light sensor for monitoring light wave modules. The list can be expanded as desired to include additional types of sensors.

In the plug connector module 2, the sensor 3 is connected by way of electric lines to electrical contact means 26. It is also possible in an expedient manner to allocate an electronic component 42 to the sensor 3. This electronic component 42 can be used to convert sensor data and to identify the plug connector module 2. All electrical contact means 26 together form an electrical connection 25 on the plug connector module 2.

The electrical contact means 26 are provided in an expedient manner on the side faces 27 of the plug connector module 2. In accordance with the invention, the sensor 3 is not only connected to an electrical connection 25 but is also connected to a first electrical connection 25' and a second electrical connection 25". Each of the electrical connections 25', 25" is provided on one of the side faces 27', 27" of the plug connector module 2. This arrangement renders it possible to route the connection of the sensors 3 through the plug connector module 2. The sensor 3 of the plug connector module 2 can thus be contacted by way of the electrical connection 25' and simultaneously a further plug connector module 2' can be contacted by its sensor 3' on the plug connector module 2 by way of the electrical connection 25".

Figure 2:
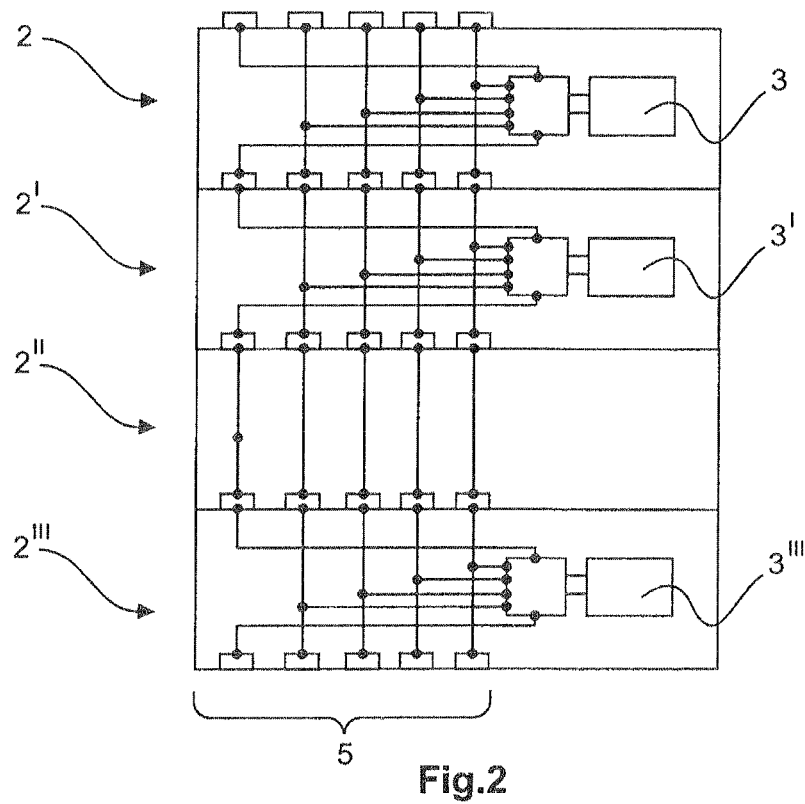
FIG. 2 illustrates a schematic view of four contacted plug connector modules.

The contacting arrangement of multiple plug connector modules 2, 2', 2", 2''' adjacent to one another is illustrated in FIG. 2. The illustrated four plug connector modules are arranged adjacent to one another, as they would also be arranged in the retaining frame 7. The side faces 27' of the plug connector modules 2, 2', 2", 2''', are allocated in each case to a side face 27" of a further plug connector module 2, 2', 2", 2'''.

The electrical connections 25' of the plug connection modules 2, 2', 2", 2''' thus make contact with the electrical connections 25" of the adjacent plug connector modules 2, 2', 2", 2'''. For this purpose, the electrical contact means 26' of the electrical connections 25' are preferably embodied as pin contacts and the electrical contact means 26" of the electrical connections 25" are preferably embodied as bush contacts.

It is thus possible for the plug connector modules 2, 2', 2", 2''' to make contact with one another, as a consequence of which a data bus line 5 is formed by means of the plug connector modules 2, 2', 2", 2'''. All sensors 3, 3', 3''' of the plug connector modules 2, 2', 2", 2''' are thus electrically connected with one another by way of the data bus line 5.

It is also possible to loop the data bus line 5 through a plug connector module 2" without a sensor 3, as illustrated in FIG. 2.

Figure 3:
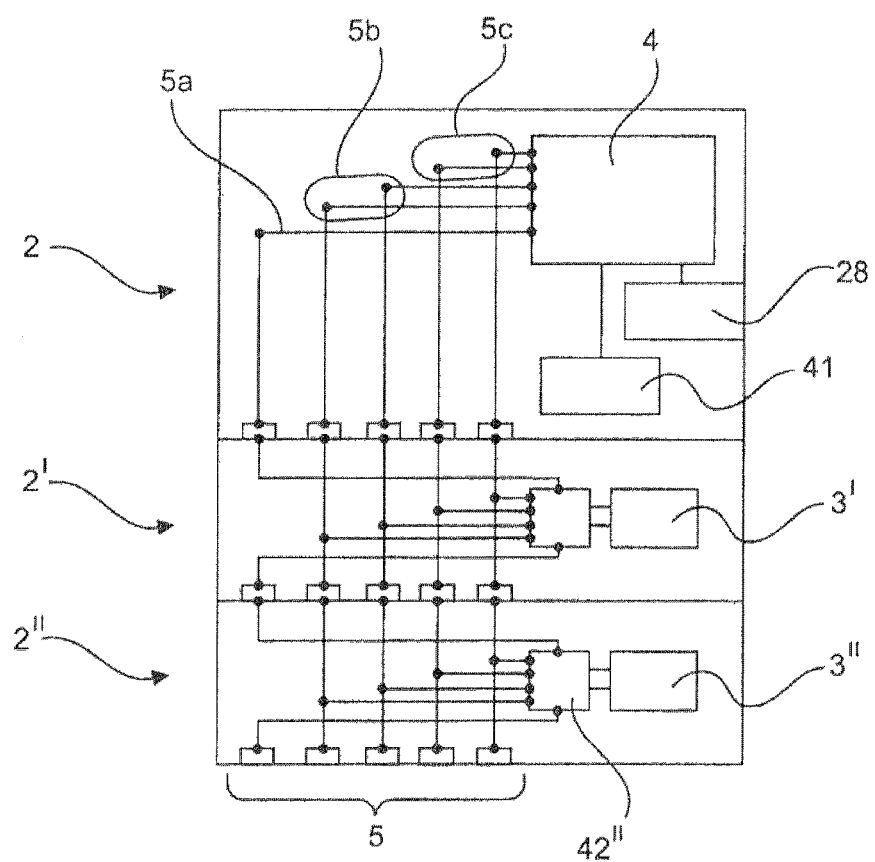
FIG. 3 illustrates a schematic view of three further plug connector modules.

FIG. 3 illustrates three further plug connector modules 2, 2', 2", which as already illustrated in FIG. 2 are arranged adjacent to one another and electrically connected to one another. Only the plug connector modules 2', 2" are fitted with sensors 3', 3".

The plug connector module 2 is embodied as a main or master module and comprises an electronic evaluating unit 4. The electronic evaluating unit 4 is provided for the purpose of evaluating and processing the measured data of the sensors 3. For this purpose, the data bus line 5 is connected to the electronic evaluating unit 4.

The data bus line 5 can comprise different individual lines depending upon the design and type of the bus system being used. In the illustrated exemplary embodiments in FIGS. 1, 2 and 3, five individual lines are provided in the data bus line 5. The line 5a is a line that extends in series through all plug connector modules 2, said line being used to identify the plug connector modules 2. The energy lines 5b are used to supply current to the sensors 3 and the electronic components 42. The data lines 5c are provided for communicating between the electronic evaluating unit 4 and the electronic components 42.

In the illustrated exemplary embodiment, the plug connector module 2 comprises further components. A memory storage medium 41 is provided. This can be used to store measured values or settings of the electronic evaluating unit 4. It is also feasible to connect the memory storage medium 41 by way of a plug-in site to the electronic evaluating unit 4.

In addition, an interface 28 is provided, by way of which it is possible to communicate with the electronic evaluating unit 4. The interface 28 can be embodied by way of example as a LAN interface, serial interface, WLAN interface or a Bluetooth interface. Other types of interfaces are also feasible.

Figure 5:
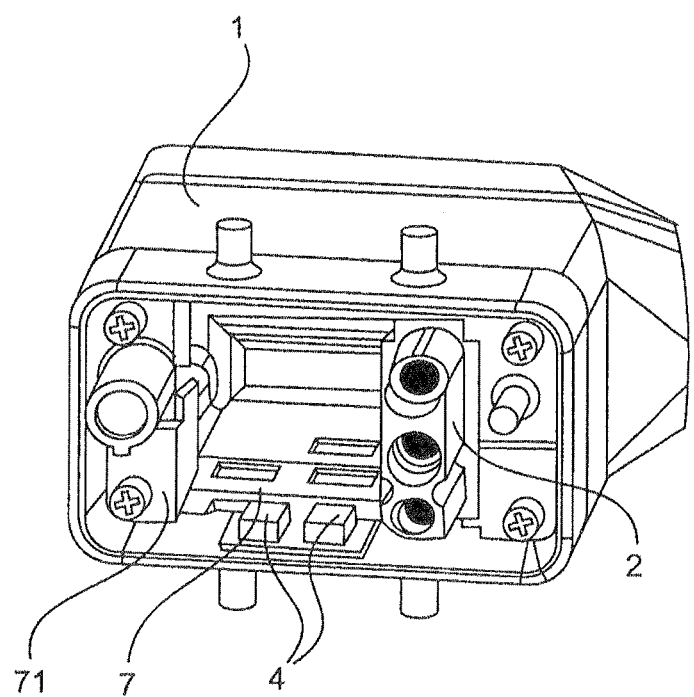
FIG. 5 illustrates a modular plug connector.

FIG. 5 illustrates a modular plug connector in accordance with the invention with a view of the plug-in side. The figure illustrates a plug connector housing 1 with a retaining frame 7 received therein. The retaining frame 7 is retained in the plug connector housing 1 by way of the fastening means 71. The fastening means 71 are screwed into the plug connector housing 1 by means of screws.

The illustrated retaining frame 7 is embodied with three module plug-in sites 72, wherein only one plug connector module 2 is received in the retaining frame 7. In this embodiment, the electronic evaluating unit 4 is provided in the plug connector housing 1 and attached to the inner face thereof. The occupation of a module plug-in site 72 by means of a master plug connector module 2 as is known from FIG. 3 is not a necessity. All module plug-in sites 72 can be used for plug connector modules 2 and for transmitting currents and/or signals.

Figure 6:
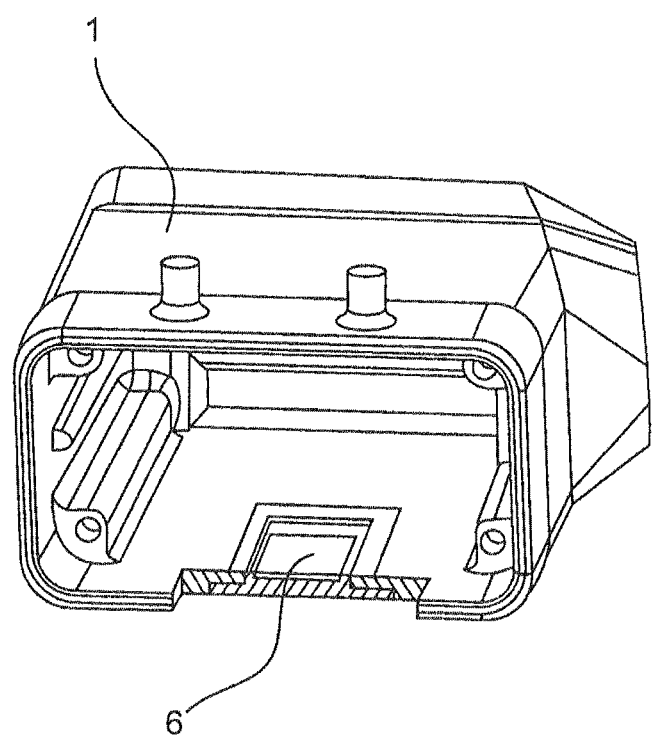
FIG. 6 illustrates a plug connector housing.

FIG. 6 illustrates a further embodiment of the plug connector housing 2. For the sake of clarity, the retaining frame 7 and plug connector modules 2 are omitted from the figure. In this particular embodiment, the plug connector housing 2 comprises a bidirectional interface 6 that is inlaid in a side wall of the plug connector housing 2. The lower region of the bidirectional interface 6 and also the side wall of the plug connector housing 2 are illustrated by way of illustration in partial section.

The bidirectional interface 6 can be made available in an expedient manner by means of a touch-screen-display that is connected to the electronic evaluating unit. The bidirectional interface 6 thus renders it possible to perform an individual request for measured values and also to use and program the electronic evaluating unit.

As an alternative to a touch-screen-display, it is also possible to integrate a simple display or a display as a bidirectional interface 6 into the plug connector housing 1 and to supplement said display by means of an input device (e.g. keys or keypad).

Plug Connector System

LIST OF REFERENCE NUMERALS

1 Plug connector housing
2 Plug connector module
3 Sensor
4 Electronic evaluating unit
5 Data bus line
6 Bidirectional interface
7 Retaining frame
71 Fastening means
72 Module plug-in site
22 Retaining means
23 Contact side
24 Connection side
25 Electrical connection 26 Electrical contact means
27 Side face
28 Interface

The invention claimed is:

1. A method of configuring a modular plug connector, comprising:
   a plug connector housing, a retaining frame, a bus system and at least one plug connector module,
   wherein the retaining frame has at least one site having at least one plug connector module inserted therein,
   wherein an electronic evaluating unit comprising at least one sensor is provided in the at least one plug connector module,
   wherein an electronic control unit for the bus system is integrated into the electronic evaluating unit and connected in an electrical manner by the bus system to the at least one sensor,
   wherein the at least one plug connector module comprises an electronic addressing system that is adapted for communication by way of the bus system,
   wherein the at least one plug connector module comprises at least one electrical connection for the bus system,
   wherein the bus is integrated into the retaining frame, and wherein
   the bus system is expanded by an individual line that extends in series through the plug connector modules,
   comprising the steps of:
   a) generating an ID by the electronic evaluating unit,
   b) storing the ID in the electronic evaluating unit,
   c) transmitting the ID by the electronic evaluating unit by way of the bus system,
   d) receiving the ID by the electronic component,
   e) increasing the ID by the value 1 by the electronic component,
   f) storing the new ID in the electronic component, and
   g) transmitting the new ID by the electronic component by way of the bus system.

2. The method of configuring a modular plug connector as claimed in claim 1, wherein steps d) to g) are performed in series by each further electronic component.

3. The method of configuring a modular plug connector as claimed in claim 2, wherein the ID is transmitted by the electronic evaluating unit to the electronic component and each further electronic component in each case by way of a line of the bus system, said line extending in series through the plug connector modules.

4. The method of configuring a modular plug connector as claimed in claim 1, wherein: during the configuration a line of the bus system functions as an interrupt line,
   wherein the interrupt line is earthed at each of the electronic components,
   wherein a voltage is applied at the interrupt line,
   wherein the interrupt line is monitored by the electronic evaluating unit, and
   wherein each electronic component separates the earth of the interrupt line after step f).

5. The method of configuring a modular plug connector as claimed in claim 1, wherein the electronic evaluating unit loads calculating and/or evaluating algorithms corresponding to the construction of the modular plug connector from a database.

* * * * *